May 30, 1944.  S. RINCON  2,350,291
MOLDING APPARATUS
Filed May 19, 1943  2 Sheets-Sheet 1
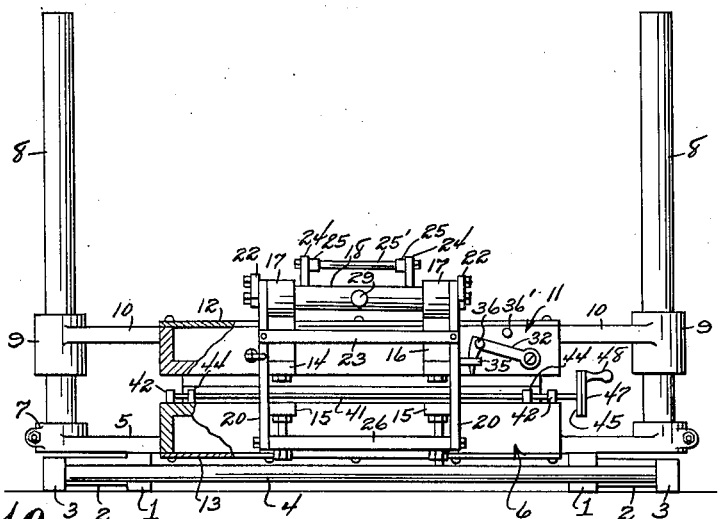
Fig. 1.
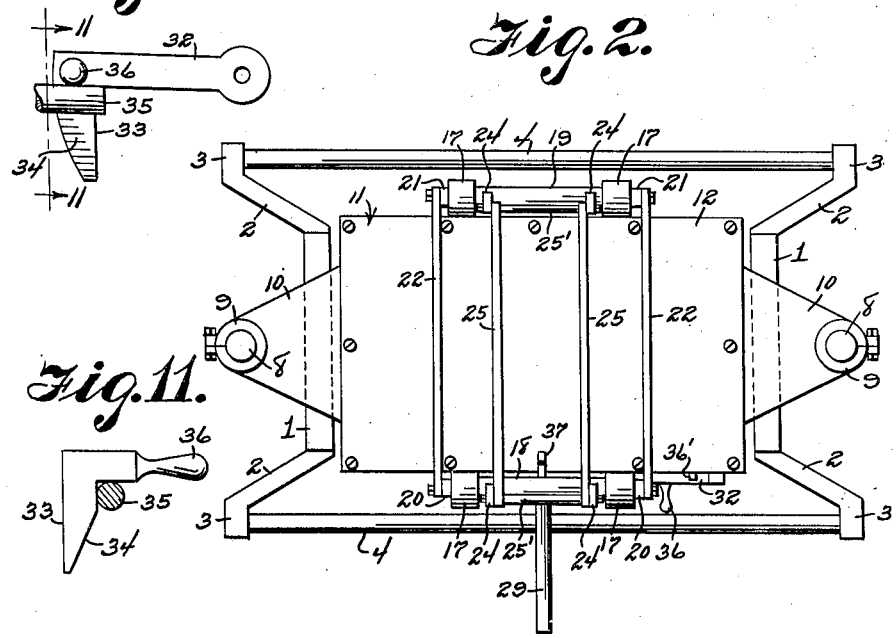
Fig. 10.
Fig. 2.
Fig. 11.
Salvador Rincon INVENTOR.
BY
Victor J. Evans & Co.
ATTORNEYS May 30, 1944.  S. RINCON  2,350,291
MOLDING APPARATUS
Filed May 19, 1943   2 Sheets-Sheet 2

Salvador Rincon INVENTOR.

BY
Victor J. Evans & Co.
ATTORNEYS

Patented May 30, 1944

2,350,291

UNITED STATES PATENT OFFICE 2,350,291

MOLDING APPARATUS

Salvador Rincón, Mexico City, Mexico

Application May 19, 1943, Serial No. 487,653
In Mexico May 13, 1940

5 Claims. (Cl. 18—34)

This invention relates to molding apparatus, and its general object is to provide an apparatus that is primarily designed for forming articles, such as boxes and like containers from pulp, preferably made from waste pasteboard and the like, the apparatus including a press cooperating with a mold for forming the articles, and the mold is of a type fully disclosed in my co-pending application filed May 9, 1941, Sr. No. 392,795.

A further object is to provide molding apparatus that includes thermal means for drying the articles during the molding process, and means is provided for removing the articles from the mold, without any possibility of damaging the same.

An important object is to provide molding apparatus including mold pressure means and means for locking the same in pressing position.

Another object is to provide molding apparatus that is simple in construction, inexpensive to manufacture, and extremely efficient in operation, use and service.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a front view of the molding press, with the thermal units broken away and in section.

Figure 2 is a top plan view thereof.

Figure 10 is an enlarged side view of the means for holding the press locking means in released position.

Figure 11 is a sectional view taken approximately on line 11—11 of Figure 10, looking in the direction of the arrows.

Figure 3:
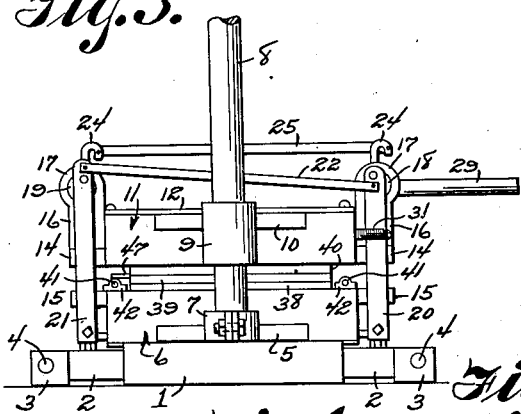
Figure 3 is an end view of the molding press.

Referring to the drawings in detail, it will be noted as best shown in Figures 1 and 2 that the press is of elongated rectangular configuration and includes a base in the form of a frame that is made up of a pair of parallel end members 1 formed with outwardly directed diverging portions 2 terminating in angle ends 3, and bridging the end members and fixed to the ends 3 thereof are rods 4.

Resting on and preferably secured to the end members 1 are horizontally disposed triangular plate like members 5 which are fixed to the end walls of the lower thermal or heating unit 6 and formed on the apexes of the members 5 are split collar like sockets 7 having fixed therein, the lower ends of upright rods or guide posts 8. Slidably mounted on the guide posts 8 are collars 9 which are fixed to the apexes of triangular plate like members 10, the latter being fixed to the end walls of the upper thermal or heating unit 11, which overlies the lower unit 6 and cooperates therewith to set up a pressing action against the mold.

The thermal or heating units are of flat rectangular configuration and are hollow to provide chambers for a heating medium, such as steam, hot air or the like, which may be supplied thereto from any suitable source by conduits not shown, and suitable exhaust means are provided for the units, as will be apparent, but the units may be heated by electric elements or the like, mounted therein. The confronting or pressure plate walls of the units are relatively thick and the same is true with respect to the side and end walls, and access is had to the interior of the units or chambers by removable closure plates 12 and 13, the plate 12 closing the top of the upper unit 11, while the plate 13 closes the bottom of the lower unit 6. The thermal units not only act as heating means for the mold, but set up a pressure against the same, as previously indicated and clearly shown in Figures 1 and 3, and in order to bring about that pressure and to lock the upper unit relative to the lower unit, and in pressing engagement against the mold, I provide a pair of lugs 14 formed on and extending from the opposite sides fo the upper unit 11 and similar lugs 15 are formed on and extend from the opposite sides of the lower unit 6.

Secured to and rising from each of the lugs 14 is a block 16 that is formed with a collar bearing 17 at the upper end thereof, and rotatably mounted in companion or registering bearings 17 are shafts 18 and 19 respectively. Eccentrically pivoted to the ends of the shafts 18 and 19 are the upper ends of front and rear strip like depending latch arms 20 and 21 respectively, and the arms are connected together for movement in unison by side links 22, the pivots of the links at one end being disposed above the pivots of the arms and at their opposite ends below the pivots of the arms, as clearly shown in Figure 7. The arms are also connected together adjacent their upper ends by brace members 23 that are fixed thereto, as shown in Figure 9.

Fixed to each of the shafts 18 and 19, and extending therefrom between the bearings thereof, is a pair of hook like members 24 having their hooked or arcuate portions disposed forwardly or toward the front of the apparatus, and the free ends of the members 24 of the shaft 18 have pivotally connected thereto, one of the ends of links 25, while the opposite ends of the links 25 are pivotally connected to the free ends of the members 24 of the shaft 19. The pivots of the links 25 are provided by cross rods 25'.

Figure 8:
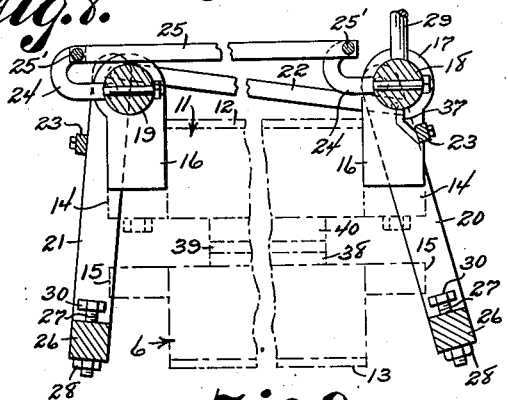
Figure 8 is a vertical sectional view taken through Figure 7, but with the locking means in released position.
Figure 9:
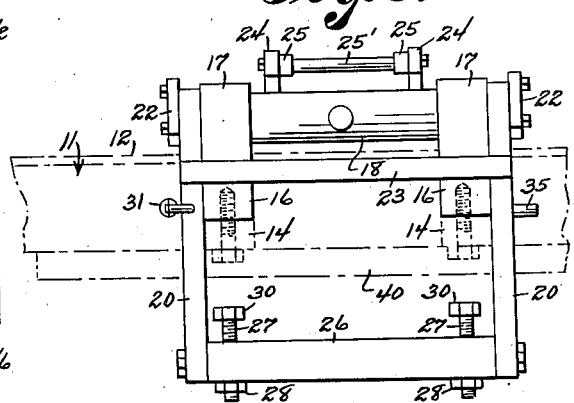
Figure 9 is a view taken at right angles to Figure 7, looking toward the left thereof.

Fixed to and bridging the lower ends of the latch arms are cross bars 26, each having a pair of headed screw bolts 27 threaded therein for vertical adjustment as will be apparent upon inspection of Figures 8 and 9, the bolts having their heads uppermost and are locked in adjusted positions by nuts 28 bearing against the under face of the bars, and fixed to the shaft 18 and extending midway the ends thereof, as well as in a direction at right angles to that of the hook like members 24, is a hand lever 29.

Figure 7:
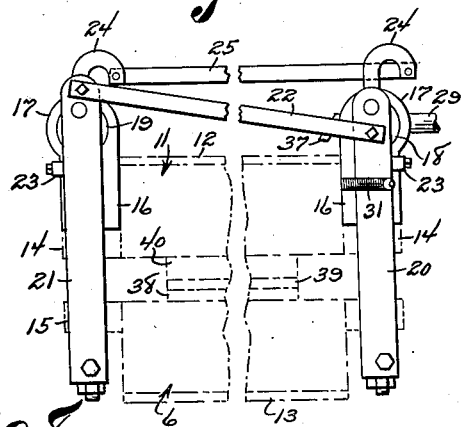
Figure 7 is a side elevation of the press locking means and illustrates the arrangement thereof in operative or locked position.

The heads 30 of the bolts 27 are engageable with the underfaces of the lugs 15 for locking the upper thermal unit relative to the lower thermal unit in pressed relation with the mold, and in order to urge the arms to their position of Figure 7 to bring about the locking function, I provide a coil spring 31 connected to one of the arms 20 and the front wall of the upper unit 11. I also provide means as best shown in Figures 10 and 11 for holding the arms in their position of Figure 8 for spacing the bolt heads 30 laterally from the lugs 15 or in other words in released position, and the holding and spacing means includes a hook like member provided with a shank 32 pivoted at one end to the upper unit 11 and paralleling the same, the shank having an elongated head 33 formed on its free end and the head is not only tapered toward its outer end, but is beveled as at 34 to bear against a pin 35 that is fixed to the outer side face of the other arm 20, as best shown in Figure 1. A handle 36 is formed on the free end of the shank 32 for raising the holding and spacing means to the position of Figure 1, so as to allow the arms to move inwardly for disposal of the headed screw bolts to their locked position of that figure. The holding and spacing means is limited in its upward movement by a stop pin 36'.

The shaft 18 also has formed thereon midway its ends and diametrically opposite the hand lever or handle 29, a finger 37 having an angularly bent outer end portion engageable with the brace member 23 between the front arms 20 for moving the arms outwardly and consequently the headed bolts to a released position when free from the lugs 15. That position of the arms is clearly shown in Figure 8.

From the foregoing, it is believed that the operation of the press locking means will be obvious, but it might be mentioned that when it is desired to lock the upper unit relative to the lower unit, and it being assumed that the mold is in place between the units and that the arms are held in their outermost or released position of Figure 8 by the head 33 engaging the pin 35, as shown in Figures 10 and 11, the head 33 is first raised by the handle 36, to allow inward movement of the arms for positioning the bolt heads 30 below the lugs 15. The shaft 18 is then rotated by the handle 29 and such movement will draw the heads in bearing or locking engagement against the lugs 15 and thereby lock the units against the mold.

When it is desired to release the units, the reverse action takes place, that is the handle 29 is raised from its horizontal position of Figure 7, and such will result in releasing the bolts 27 from the lugs 15. Further upward movement of the handle 29 will cause the finger 37 to engage the brace member 23 between the front arm 20 to move the arms outwardly and thence position the bolt heads 30 laterally of the lugs 15, as will be apparent upon inspection of Figure 8. The holding and spacing means will then drop by gravity for disposing the head 33 thereof relative to the pin 35, as shown in Figures 10 and 11, to hold the arms accordingly.

The mold shown is of the type fully disclosed in my co-pending application previously identified and includes three sections, namely a lower or male section 38 having cores secured thereto, an intermediate or article expelling section 39, and an upper or female section 40.

Figure 4:
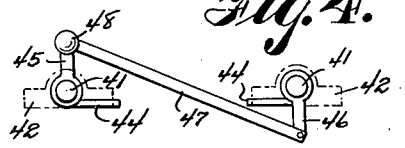
Figure 4 is a detail view of the means for actuating the article removing or expelling section of the mold, and with said means arranged in normal position.
Figure 5:
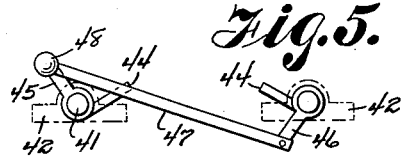
Figure 5 is a similar view of the means of Figure 4, in operative position.
Figure 6:
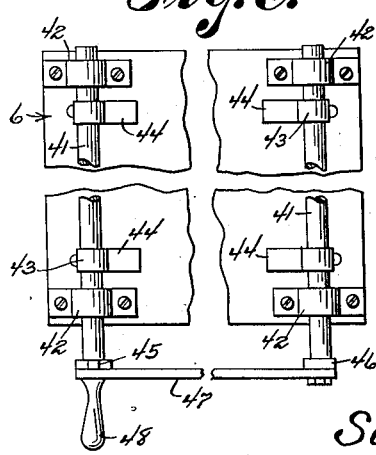
Figure 6 is a top plan view of Figure 4.

In order to facilitate raising of the intermediate or expelling section to remove the molded articles from the cores of the male section, I provide mechanism as best shown in Figures 4, 5 and 6. That mechanism includes a pair of shafts 41 mounted in bearings 42, for disposal along the side edges of the top wall of the lower unit 6, as best shown in Figure 1, and the shafts have fixed thereto collars 43 which are formed with inwardly directed flat tongues 44 mounted for movement in recesses in the sides of the lower section 38 of the mold, to engage the under face of the intermediate section 39, and thus raise the same, upon movement of the shafts 41. One of the shafts 41 has an upwardly directed crank arm 45 secured to one end thereof and the adjacent end of the other shaft 41 has a downwardly directed crank arm 46 secured thereto, and the crank arms have connected to the outer ends thereof, the ends of a link 47, which has formed on one end thereof a handle 48, so that upon movement of the handle, the shafts 41 will be rotated in unison for operating the tongues 44 accordingly, as will be apparent upon inspection of Figures 4 and 5.

It will be obvious that in order to charge the mold, that the upper thermal or heating unit 11 together with the locking means carried thereby must be removed, by sliding the same upwardly on the posts 8. The upper mold section 40 is likewise removed. When the mold is charged, the upper section is replaced together with the upper thermal unit and the locking means, and finally the latter is locked in place in the manner as previously described.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. In a molding apparatus, a press including upper and lower thermal units for receiving a mold between the same, said upper unit being movably mounted relative to the lower unit and cooperating therewith to set up pressure against the mold, means for locking the upper unit in pressing position, and said means including a pair of shafts mounted for rotation and carried by the upper unit, arms eccentrically connected to the ends of the shafts and depending therefrom for swinging movement toward and away from the lower unit, means secured to and bridging the lower ends of the arms, adjustable means carried by the bridging means for disposal into and out of bearing relation with the lower unit, means connecting the arms together for movement thereof in unison, and means including a handle secured to one of said shafts for operating the arms.

2. In a molding apparatus, a press including upper and lower thermal units for receiving a mold between the same, said upper unit being movably mounted relative to the lower unit and cooperating therewith to set up pressure against the mold, means for locking the upper unit in pressing position, and said means including a pair of shafts mounted for rotation and carried by the upper unit, arms eccentrically pivoted to the ends of the shafts and depending therefrom, means carried by the lower ends of the arms for disposal into and out of bearing relation with the lower unit, links having one of their ends pivotally connected to the arms of one shaft above the pivots thereof and their opposite ends pivotally connected to the arms of the other shaft below the pivots thereof, an operating hand lever secured to one of said shafts, and means secured to the latter shaft and certain of the arms for moving said arms away from the lower unit.

3. In a molding apparatus, a press including upper and lower thermal units for receiving a mold between the same, said upper unit being movably mounted relative to the lower unit and cooperating therewith to set up pressure against the mold, means for locking the upper unit in pressing position, and said means including a pair of shafts mounted for rotation and carried by the upper unit, arms eccentrically pivoted relative to the ends of the shafts and depending therefrom, lugs formed on and extending laterally from the lower unit, means carried by the lower ends of the arms for disposal into and out of bearing relation with the lugs, links having one of their ends pivotally connected to the arms of one shaft above the pivots thereof and their opposite ends pivotally connected to the arms of the other shaft below the pivots thereof, arcuate means fixed to each of the shafts between their ends and having free ends disposed in the same direction, links connecting the free ends of said arcuate means of one shaft to those of the other shaft, and means including a handle secured to one of said shafts for operating the arms.

4. In a molding apparatus, a press including upper and lower thermal units for receiving a mold between the same, said upper unit being movably mounted relative to the lower unit and cooperating therewith to set up pressure against the mold, means for locking the upper unit in pressing position, and said means including bearing members fixed to the upper unit, a pair of shafts mounted for rotation in said bearings, arms eccentically connected to the ends of the shafts and depending therefrom for swinging movement toward and away from the lower unit, cross bars secured to and bridging the lower ends of the arms, lugs formed on and extending laterally from the lower unit, headed bolts threaded in the cross bars for disposal of the heads thereof into and out of bearing engagement with said lugs, means connecting the arms together for movement thereof in unison, a spring for urging the arms toward the lower unit, an angular member pivoted to the upper unit and releasably engageable with a pin carried by one of said arms for holding the arms at one side of the units disengaged from the lower unit, an operating hand lever secured to one of said shafts midway the ends thereof, brace bars secured to and bridging the arms adjacent their upper ends, and a finger secured to the latter shaft and engageable with the adjacent brace bar for moving said arms away from the lower unit.

5. In a molding apparatus, a press including upper and lower units for receiving and pressing a mold between the same, said mold including a section for expelling molded articles therefrom, means for lifting said section to expel said articles and including bearings fixed to the upper face of the lower unit, parallel shafts mounted for rotation in the bearings, an upwardly directed crank arm secured to one shaft, a downwardly directed crank arm secured to the other shaft, a handled link bridging and pivotally connected to the ends of the crank arms, collars fixed to said shafts, and tongues formed on said collars and being inwardly directed therefrom for engagement with said section.

SALVADOR RINCÓN.